United States Patent Office 3,546,024
Patented Dec. 8, 1970

3,546,024
CHARGEABLE CELL
Hans Niklas, Duisburg, Germany, assignor to Varta Aktiengesellschaft, Frankfurt am Main, Germany
Filed July 18, 1968, Ser. No. 745,746
Claims priority, application Germany, July 28, 1967,
V 20,632
Int. Cl. H01m 31/04
U.S. Cl. 136—182                                    10 Claims

ABSTRACT OF THE DISCLOSURE

A chargeable galvanic cell has a housing, a rolled-foil electrode assembly accommodated therewithin and surrounding an inner free space, and a temperature-responsive switch arranged within this inner free space and electrically so connected as to be capable of operative association with an external source of electrical energy used for charging the cell and to control the operation of this source dependent upon the temperature of the cell during charging of the latter as sensed by the temperature-responsive switch.

BACKGROUND OF THE INVENTION

The present invention relates generally to a chargeable cell, and more particularly to a chargeable galvanic cell. Specifically, the present invention relates to an accumulator provided with thermally-responsive means which senses the temperature of the accumulator.

Rechargeable accumulators are not new, nor is it new to provide such rechargeable accumulators with thermoelectric components for controlling the charging process. Thus, in lead-accumulators the oxy-hydrogen obtained during charging at the point of free gasing, is catalytically burned and the heat of combustion is sensed by a thermoresponsive switch or by a resistor having a negative temperature coefficient, either of which is operatively associated with the charging equipment so that the operation of the latter is controlled in dependence upon heat of combustion developed in the cell or accumulator.

Constructions of this type have their uses and it should not be inferred that they are not operational. However, they do suffer from disadvantages one of which is the fact that they are of complicated construction and require space which is at a premium in accumulators whose dimensions desirably should be as small as possible. Moreover, for reasons known to those skilled in this field these arrangements cannot be utilized at all in alkaline-type accumulators.

It is thus a general object of the present invention to provide a construction which overcomes the aforementioned disadvantages.

A more particular object of the invention is to provide such a construction which allows for control of the charging operation in response to the development of heat in the accumulator, but a construction which is significantly simpler than those known heretofore while being at least equal in its safety of operation.

A further object of the invention is to provide such a construction which requires no additional space beyond the dimensions required for an accumulator not provided with such a construction.

A concomitant object of the invention is to provide such a construction of the type here under discussion which is particularly suitable for use with alkaline-type accumulators, especially those comprising rolled-foil electrodes.

SUMMARY OF THE INVENTION

In pursuance of the above objects, and others which will become apparent hereafter, one feature of my invention resides in the provision of a chargeable galvanic cell comprising a housing and a rolled-foil electrode assembly accommodated within the housing. The electrode assemblies surround an inner free space. Temperature-responsive switch means is arranged within this inner free space and is adapted to be operatively associated with an external source of electrical energy when the same is connected with the cell for the purpose of charging the latter. Thus, the temperature-responsive switch means responds to the temperature of the cell, which will change as the cell undergoes charging, and the switch means will in turn control the operation of the source of electrical energy in dependence upon such temperature changes which it senses.

The temperature-sensitive switch means may be either a thermo-electric element or a bi-metallic element, but in accordance with the invention it will be arranged in the free space within the electrode assembly so as to require no additional room for its installation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
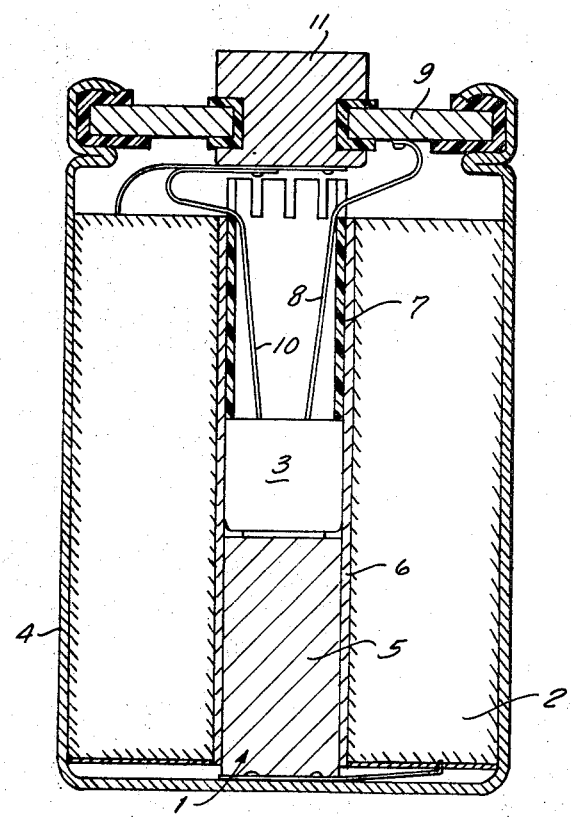
FIG. 1 is a somewhat schematic vertical section through one embodiment of the present invention.

Discussing now the drawing in detail, and firstly FIG. 1 thereof, it will be seen that the accumulator, which here is assumed to be an alkaline-type accumulator, comprises an outer housing 4 having arranged therein a rolled-foil electrode assembly 2. Because the assembly 2 is of annular configuration it encloses in its interior an inner free space 1.

In accordance with the invention a thermo-electric element 3 is accommodated in the inner free space within the electrode assembly 2. It is supported on a support member 5 also accommodated in the inner free space. Advantageously, and as illustrated in FIG. 1, a tubular member 6 of insulating material is located in this inner free space lining the surrounding wall portions of the electrode assembly 2. In fact, the tubular member 6 may be used as a winding mandrel when the electrode assembly is produced. On the other axial side of the thermo-electric element 3 a slotted spacer tube 7 is accommodated within the tubular member 6, and a conductor 8 extends through the tube 7 from the element 3 to a control contact 9 while a similar conductor 10 extends from the element 3 to the positive pole 11 of the accumulator. To charge the accumulator illustrated in FIG. 1 the same is connected with the source of charging current via the casing 4 which thus constitutes the negative pole, and via the positive pole 11. A rise in temperature in the accumulator during charging is sensed by the thermo-electric element 3 and control of the source of charging current in response to such temperature change is effected through the control conductor 9 and the positive pole 11 of the accumulator.

Figure 2:
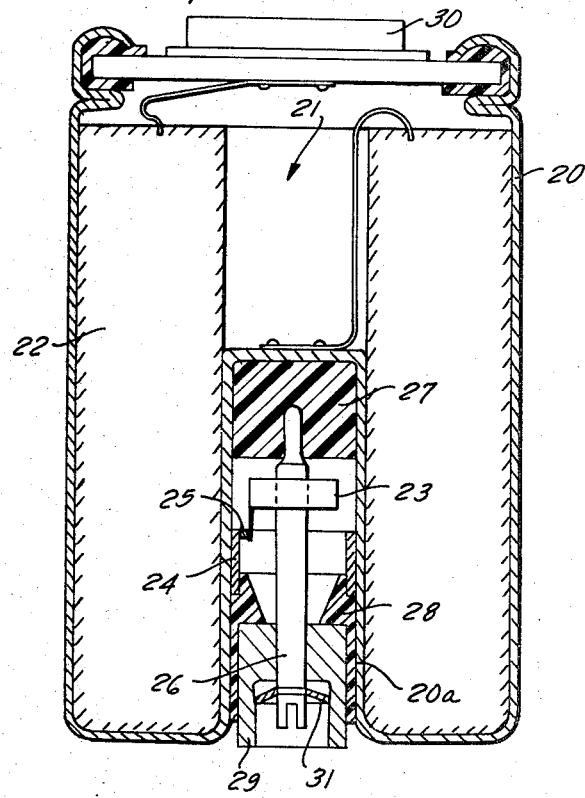
FIG. 2 is a view similar to FIG. 1 but illustrating a further embodiment of the invention.

By resorting to this construction, or the embodiment illustrated and to be described hereafter in FIG. 2, it is clear that the provision of the thermally responsive means does not increase the overall dimension of the accumulator; in other words, the accumulator provided with the thermally responsive means will have the same overall dimensions as an identical accumulator which is not provided with such means. Furthermore, the thermally responsive means is arranged in a posiiton most favorable for sensing temperature changes, thus providing a more responsive construction than would otherwise be possible.

The embodiment illustrated in FIG. 2 shows an accumulator having a housing 20 which constitutes the negative pole for charging purposes. The rolled-foil electrode assembly is identified with reference numeral 22 and is accommodated in the housing 20. In turn, the rolled-foil electrode assembly 22 surrounds an inner free space 21. Unlike the embodiment of FIG. 1, however, in FIG. 2 the housing 20 is so configurated as to be provided with an inwardly extending tubular portion 20a extending into the inner free space 21 lining the adjacent wall portions of the electrode assembly 22.

In this embodiment the thermally responsive means is constituted by a bi-metallic spiral 23 located within the free space 21. An electrically conductive ring 24 is located within the space 21, also, and is provided with a contact projection 25 engaged by the bi-metallic spiral 23 which latter contracts and expands in known manner. The ring 24 is electrically connected with the housing 20 or, if the latter should not constitute the negative pole of the accumulator, with whatever member constitutes the negative pole.

It is desirable that the operating temperature of the bi-metallic spiral 23 be adjustable within a wide range. For this purpose I have provided an adjusting pin 26 extending into the interior of the inner free space 21 having a leading end portion received in a member 27 of insulating material which is located within the projecting portion 20a of the housing 20. The trailing end portion of the pin 26 extends through and is held by a control contact 29 which in turn is secured and embedded in a member 28 of electrically insulating material which is also received in the portion 20a of the housing 20. One axial end of the ring 24 is similarly embedded in the member 28. Because the pin 26 is conductively connected with the bimetallic spiral 23, the control contact 29 is also connected therewith via the pin 26.

In the embodiment of FIG. 2 the cover 30 of the accumulator constitutes the positive pole. During charging of the accumulator the source of charging current is connected with the accumulator across the casing 20 and the cover 30; it is controlled in its operation through the bimetallic spiral 23 across the control contact 29 and the housing 20.

Although I have not shown this in the drawing, I have found that it is possible to prevent vibrations of the bi-metallic spiral 23, if such becomes necessary, by surrounding the same with a shock-absorbing fluid, for instance a body of oil. It is also possible, and this is illustrated in FIG. 2, to fix the adjusting pin 26 in the body of the control contacts 29 by means of a spring 31, here shown as a dished spring.

A further possible embodiment is to insert a rod-shaped bi-metallic element into the free space surrounded by the electrode assembly. However, while such an arrangement is possible it is not very sensitive and is relatively difficult to control. For this reason it is not as advantageous as the embodiments described in FIGS. 1 and 2.

It will be understood that each of the elements described above, or two or more together, may also find a useful application in other types of constructions differing from the types described above.

While the invention has been illustrated and described as embodied in a chargeable cell, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a chargeable galvanic cell, in combination, a rolled-foil electrode assembly surrounding an inner free space; a housing dimensioned to accommodate said electrode assembly; temperature-responsive switch means arranged within said inner free space; and conductor means associated with said switch means for connecting the same with an external source of electrical energy which is connected with said cell for charging the same, for control of the operation of said source by said switch means in dependence upon the temperature of said cell during charging of the latter.

2. In a cell as defined in claim 1, wherein said switch means comprises a thermo-electric element.

3. In a cell as defined in claim 1, wherein said switch means comprises a bimetallic element.

4. In a cell as defined in claim 3, said switch means further comprising a contact ring arranged in said free space and adapted to be engaged in current-conducting relationship by said bimetallic element in response to changes in the latter resulting from temperature changes in said cell; and further comprising adjusting means extending from the exterior of said cell into said free space associated with said bimetallic element and being operable for varying the operative condition of the same to thereby adjust it for different temperature ranges.

5. In a cell as defined in claim 3, said switch means further comprising a contact ring arranged in said free space and adapted to be engaged in current-conducting relationship by said bimetallic element in response to changes in the latter resulting from temperature changes in said cell, said contact ring being adjustable and comprising a contact projection adapted to be engaged by said bimetallic element.

6. In a cell as defined in claim 3, wherein said bimetallic element is immersed in a body of shock-absorbent fluid.

7. In a cell as defined in claim 6, wherein said fluid is oil.

8. In a cell as defined in claim 4, wherein said adjusting means comprises an adjusting pin having a leading end portion located in said free space connected with said bimetallic element, and a trailing end portion outside said cell; and a control member provided on said cell and associated with said trailing end portion of said adjusting pin.

9. In a cell as defined in claim 8; and further comprising spring means associated with said control member and said pin and operative for connecting the same to one another.

10. In a cell as defined in claim 1; further comprising an open-ended tubular member of electrically insulating material received in said free space, said switch means being located within said tubular member spaced from the opposite ends of the latter; a spacing insert received in said tubular member intermediate said switch means and one end of said tubular member, an additional tubular spacing insert received in said tubular member intermediate the other end of the same and said switch means, a pole contact and a control contact respectively provided on said cell outside said free space, and wherein said conductor means extends through said additional tubular spacing insert and electrically connects said switch means with said pole contact and said control contact.

References Cited

UNITED STATES PATENTS

| | | | |
|---|---|---|---|
| 976,750 | 11/1910 | Schmidt | 136—182UX |
| 2,289,128 | 7/1942 | Kopf | 136—182X |
| 2,421,523 | 6/1947 | Rady | 136—182X |
| 2,498,814 | 2/1950 | Little et al. | 136—182X |
| 3,081,366 | 3/1963 | Belove | 136—165X |

DONALD L. WALTON, Primary Examiner